United States Patent
O'Brien

(10) Patent No.: US 9,228,879 B2
(45) Date of Patent: Jan. 5, 2016

(54) FLUID LEVEL INDICATOR

(71) Applicant: Mark O'Brien, Bronx, NY (US)

(72) Inventor: Mark O'Brien, Bronx, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 267 days.

(21) Appl. No.: 13/962,508

(22) Filed: Aug. 8, 2013

(65) Prior Publication Data

US 2015/0040816 A1 Feb. 12, 2015

(51) Int. Cl.
*G01F 23/76* (2006.01)
*G01F 23/66* (2006.01)
*G01F 23/00* (2006.01)

(52) U.S. Cl.
CPC ............ *G01F 23/76* (2013.01); *G01F 23/0007* (2013.01); *G01F 23/66* (2013.01)

(58) Field of Classification Search
CPC .. B65D 23/006; B65D 49/00; G01F 23/0007; G01F 23/58; G01F 23/64; G01F 23/66; G01F 23/76; G08B 21/00
USPC ........... 116/227, 228, 229; 137/558; 215/366; 73/290 R, 305, 307, 315, 319, 322, 73/322.5
See application file for complete search history.

(56) References Cited

U.S. PATENT DOCUMENTS

| | | | | |
|---|---|---|---|---|
| 562,637 A | * | 6/1896 | Meyer | 215/366 |
| 572,329 A | * | 12/1896 | Bullard | 215/366 |
| 588,413 A | * | 8/1897 | Fitzgerald | 215/366 |
| 718,017 A | * | 1/1903 | Norris | 215/366 |
| 956,750 A | * | 5/1910 | Arsac | 215/366 |
| 1,019,659 A | * | 3/1912 | Klein | 215/366 |
| 1,085,560 A | * | 1/1914 | Flynn | 215/366 |
| 1,111,483 A | * | 9/1914 | Mathewson | 215/366 |
| 1,203,249 A | * | 10/1916 | Oettinger | 215/366 |
| 1,546,409 A | * | 7/1925 | Schmidt | 73/315 |
| 2,293,475 A | * | 8/1942 | Serra | 215/366 |
| 8,047,223 B2 | | 11/2011 | Swindler et al. | |
| 8,117,911 B2 | | 2/2012 | Rose | |
| 8,434,634 B2 | | 5/2013 | Bork et al. | |
| 8,550,111 B2 | | 10/2013 | Home | |
| 2010/0230347 A1 | | 9/2010 | Haslem | |

FOREIGN PATENT DOCUMENTS

FR 579106 A * 10/1924 ............. B65D 23/00

* cited by examiner

*Primary Examiner* — R. A. Smith
(74) *Attorney, Agent, or Firm* — Cantor Colburn LLP

(57) ABSTRACT

A fluid level indicator is provided. The indicator includes a body having a first end and a second end. The body has a first arm and a second arm extending between the first end and the second end. The first arm and the second arm defining a slot therebetween. The body further including a first plurality of teeth extending from a side of the first arm in the slot. The first plurality of teeth extending on an angle away from the first end toward the second arm. The body still further including a second plurality of teeth, extending on an angle away from the first end toward the first arm. A float member is provided having a first member and a second member with a shaft disposed therebetween. The float member being arranged with the shaft member disposed in the slot.

14 Claims, 4 Drawing Sheets

FLUID LEVEL INDICATOR

BACKGROUND OF THE INVENTION

The subject matter disclosed herein relates to a fluid level device and in particular to a device that that provides an indication of a high fluid position in an environment.

Devices are used in a wide variety of applications to indicate to personnel the fluid level within a confined space. For example, in internal combustion engines, typically a dip stick is used for checking a variety of fluids such as the engine oil or the transmission fluid. The dip stick device usually consists of a long, slender, sometimes flexible body having a handle or pull ring on one end. The body is sized to be received into an opening that extends into a fluid reservoir, such as the oil pan on an engine for example. The body portion of the dip stick will have visual markers, typically lines, hash marks or holes for example, that indicate to the user the location of the fluid level under normal or desired operating levels. To operate the dip stick, the user inserts the body into the opening and into the fluid reservoir. When the body is subsequently removed, surface tension causes a small amount of fluid to remain on the body allowing the user to see whether the reservoir level is within the range indicated by the visual markers.

Electronic monitoring devices may also be used to allow the user to understand the level of liquid in an enclosed space. Typically, these electronic devices use a float sensor that opens or closes a mechanical switch through either direct contact or magnetic operation of a component which floats on the surface of the liquid. When a mechanically actuated float is used, switching occurs when the movement of component contacts a switch. Electronic monitoring devices can be configured multiple thresholds or levels in a single sensor. Still other electronic monitoring devices use capacitive or optical probes to determine liquid level. It should be appreciated that while these monitoring devices provide a high level of accuracy, they may be costly to install and maintain. In some applications, these sensors may also experience reliability issues due to environmental contaminants, corrosive liquids, the presence of debris, and long term vibrations may deteriorate the effectiveness of the float component.

In some applications the enclosed space may be an underground structure. Since these structures, such as utility chambers or manholes for example, may include equipment, it is desirable for personnel to know not only the current level but also the high level mark of the liquid (e.g. water). These types of structures may be monitored by video cameras that allow operators to remotely determine whether water is present. To determine the high water level, operators often rely on water marks left on walls or scale sheets affixed to the wall. However, due to the confinement of the structure, low light levels, and the lack of perspective provided by a video stream, it is often difficult for operators to accurately determine the water level or the high level point.

Accordingly, while existing fluid level indicators are suitable for their intended purposes the need for improvement remains, particularly in providing a fluid level indicator that reliably, consistently and cost effectively indicates the high level point of a fluid in an enclosed space.

BRIEF SUMMARY OF THE INVENTION

According to one aspect of the invention, a fluid level indicator is provided. The fluid level indicator includes a body having a first end and a second end. The body includes a first arm extending between a first side of the first end and a first side of the second end, the body further having a second arm extending between a second side of the first end and a second side of the second end. The first arm and the second arm define a slot therebetween, the body further including a first plurality of teeth extending from the first arm in the slot, the first plurality of teeth extending on an angle away from the first end toward the second arm, the body still further including a second plurality of teeth extending from the second arm in the slot opposite the first arm, the second plurality of teeth extending on an angle away from the first end toward the first arm. A float member is provided having a first member and a second member with a shaft disposed therebetween, the float member being arranged with the shaft member disposed in the slot.

According to another aspect of the invention, another fluid level indicator is provided. The fluid level indicator includes a body having a slot extending along the length of the body. The body also includes a first set and a second set of opposing teeth within the slot, the first set and second set of opposing teeth being arranged on an angle in an interlaced manner, each of the teeth in the second set of teeth being disposed between adjacent pairs of teeth in the first set of teeth, the first set of teeth and second set of teeth defining a gap therebetween. A float member is movably coupled to the body, the float member having a shaft extending through the slot and sized to be movable between the first set and second set of opposing teeth.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The subject invention relates to a fluid level indicator that allows a user to determine the fluid level in an enclosed space with a relatively constant level or the high fluid level in a space with a variable level of fluid. Embodiments of the subject invention provide advantages with a low cost, highly reliable device that indicates a fluid level until manually reset. Embodiments of the present invention provide still further advantages in a providing a fluid level indicator that is highly visible with contrasting colors that facilitate remote monitoring of the indicator using video cameras.

Figure 1:
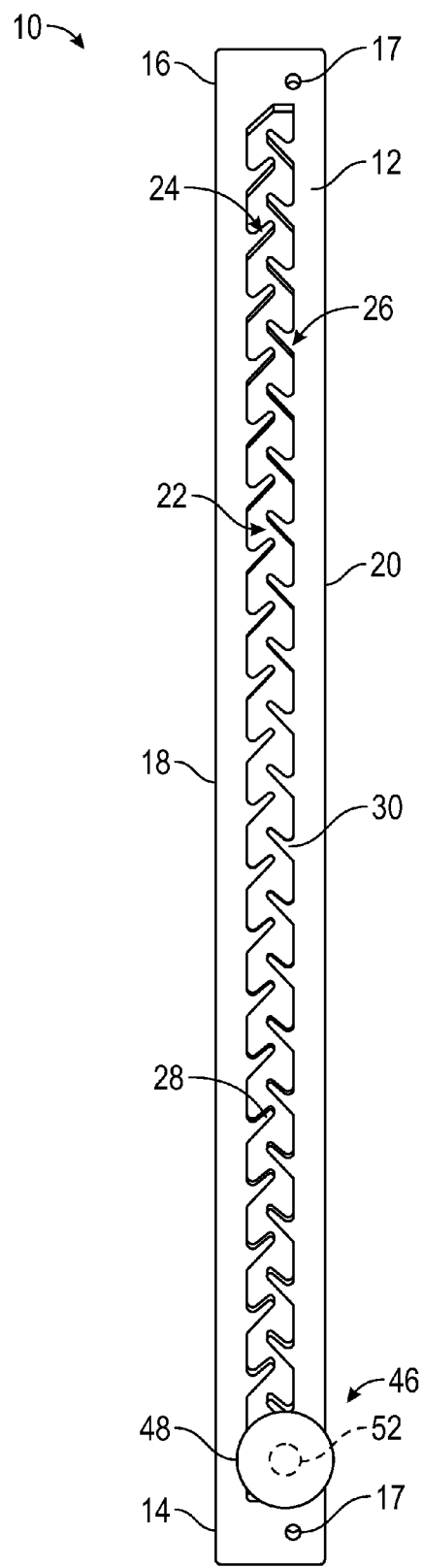
FIG. 1 is front view of a fluid level indicator in accordance with an embodiment of the invention.
Figure 2:
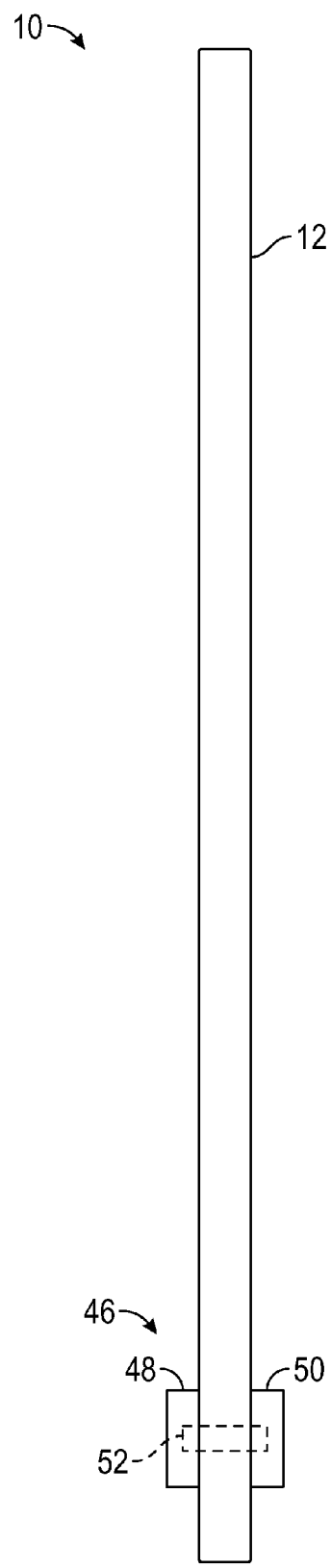
FIG. 2 is a side view of a fluid level indicator of FIG. 1.
Figure 3:
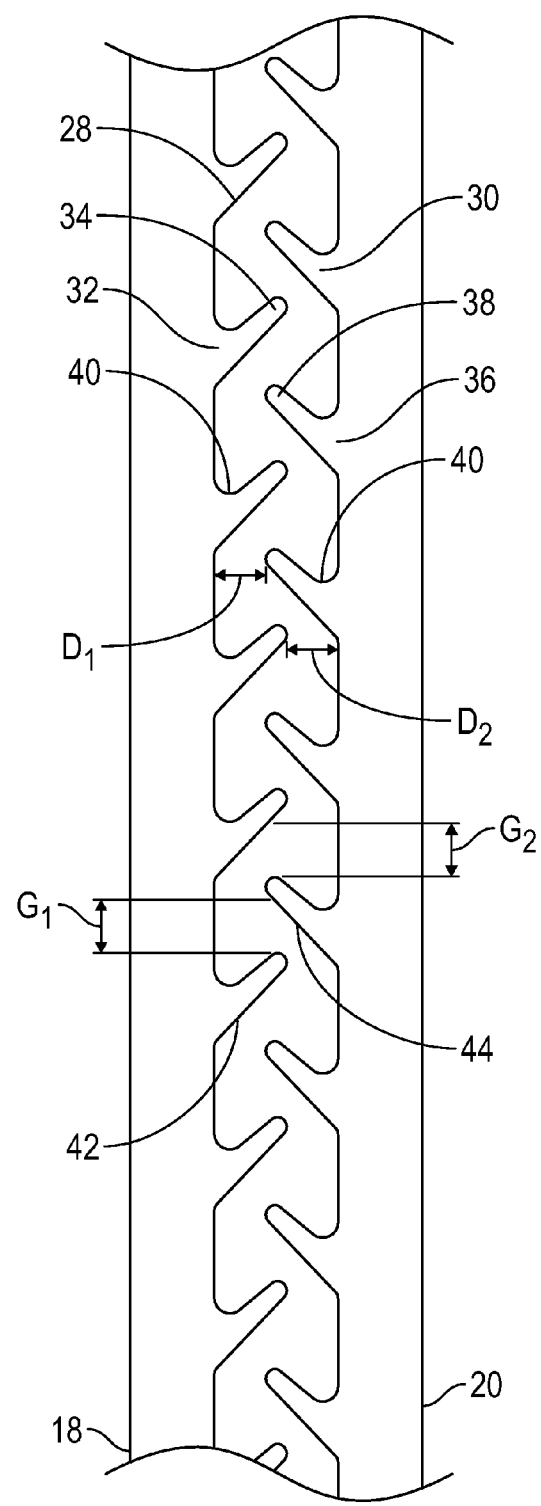
FIG. 3 is an enlarged view of a portion of the indicator of FIG. 1.

Referring to FIGS. 1-3, an embodiment is shown of the fluid level indicator 10. The indicator 10 includes a body 12 having a generally rectangular parallelepiped shape having a substantially uniform thickness along its length. The body 12 has a first end 14 and an opposing second end 16. A first arm 18 extends between the first end 14 and the second end 16 along one side. A second arm 20 extends between the first end 14 and the second end 16 on an opposing side. The first arm 18 and the second arm 20 are spaced apart to define a slot 22. The ends of the slot 22 are defined by the first end 14 and the second end 16. The first end 14 and the second end 16 may also include a feature, such as an opening 17 that is sized to receive a fastener (not shown). In the exemplary embodiment, the body 12 is made from a low cost material, including but not limited to plastic, metal or wood for example.

Within the slot are two sets of protrusions or teeth 24, 26. The first set of teeth 24 includes a plurality of teeth, one of which is indicated at 28. The second set of teeth 26 also includes a plurality of teeth, one of which is indicated at 30. Each of the teeth 28, 30 extend on an angle away from the first end 14 towards the second end 16. In the exemplary embodiment, the teeth 28, 30 extend on a 45 degree angle. The second set of teeth 26 is offset from the first set of teeth 24 such that each tooth 30 is positioned between two adjacent teeth 28. As best seen in FIG. 3, each tooth may further taper from a base area 32, 36 at the junction with the respective arms to an end 34, 38. The length of each tooth 28, 30 is sized such that the fourth end 38 is positioned a distance $D_1$ from the arm 18 and the end 24 is positioned a distance $D_2$ from the arm 20. In the exemplary embodiment, the distances D1 and D2 are sized such that the ends 34, 38 are closer to the respective opposing arm 18, 20 than the arm the respective tooth 28, 30 extends from. In this way, the sets of teeth 24, 26 are interlaced with each other. As will be discussed in more detail below, the interlacing of the teeth 24, 26 allow a float to be captured by the teeth at a fluid level during operation. In one embodiment, a curved surface, one of which is indicated at 40, extends between the surface of the tooth 28, 30 closer to the second end 16 and the respective arm 18, 20.

The teeth 28, 30 are spaced apart to define a first gap $G_1$ between the third end 34 and the bottom surface 42 of the next adjacent tooth 30. As will be discussed in more detail below, the axial or longitudinal distance of gap $G_1$ is sized to allow a shaft of a float member to pass therethrough. Similarly, a second gap $G_2$ is defined between the fourth end 38 and the bottom surface 44 of the next adjacent tooth 28. The axial or longitudinal distance of gap $G_2$ is also sized to allow the shaft of a float member to pass therethrough.

The indicator 10 further includes a float 46. The float 46 includes a first member 48 and a second member 50 disposed on opposing sides of the body 12. In one embodiment, the members 48, 50 are cylindrical in shape. The members 48, 50 are connected by a shaft 52. The shaft 52 has a diameter sized to fit and move through the gaps $G_1$, $G_2$ and within the distances $D_1$, $D_2$. In the exemplary embodiment, the members 48, 50 are made from a material having a density lower than water. It should be appreciated that in other embodiments, the members 48, 50 may be made from materials that have a different density depending on the intended application, such as a density less than motor oil for example.

The body 12 may further include indicia, such as distance indicators from the first end 14 either on the face of the body 12 adjacent the floats 48, 50 or on side (e.g. between the floats 48, 50 to allow the operator to determine the height of the float from the first end 14. In one embodiment, the indicia are in the form of a minimum level and a maximum level line. It should be appreciated that the body 12 may be made of any length suitable for the intended application.

Figure 4:
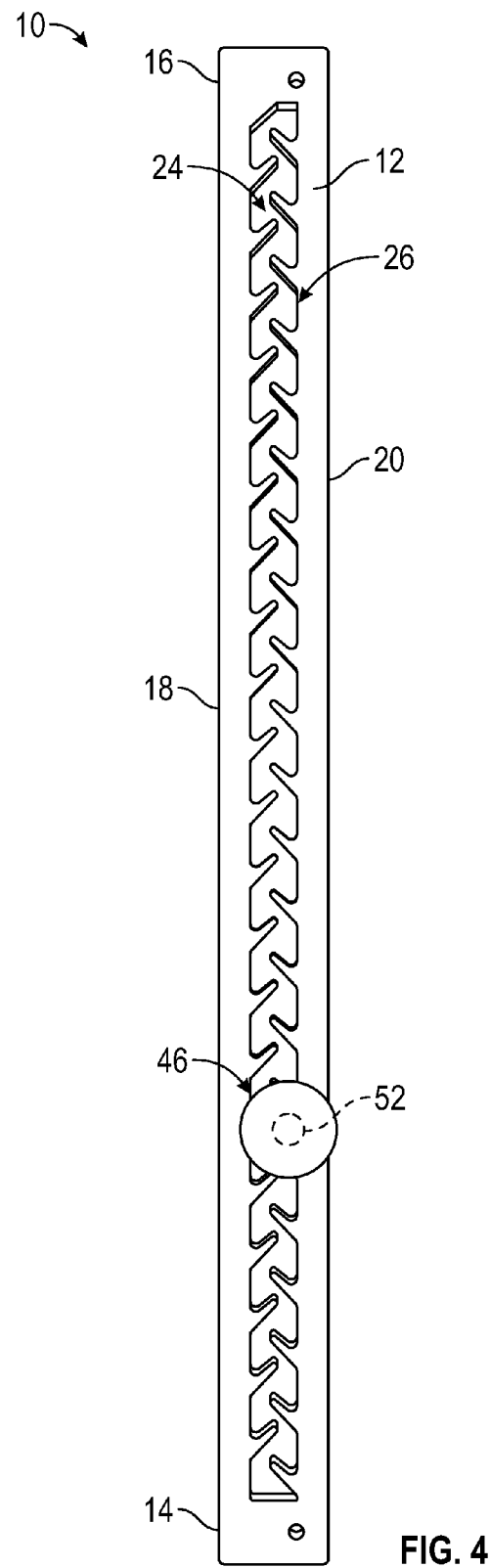
FIG. 4 is a front view of the fluid level indicator of FIG. 1 with the float in a deployed position.

The indicator 10 may be used in operation in several different applications. In one embodiment, the indicator 10 is used as a dip stick. In this embodiment, the indicator 10 is held by the operator on the second end 16 and lowered into the enclosed space containing the fluid to be measured. As the indicator 10 is lowered into the space, the buoyancy of the float 46 causes the shaft 52 to move past the teeth 24, 26 rising to the level of the fluid within the measured space. Since the teeth 24, 26 are angled toward the second end 16, as the indicator 10 is removed, the shaft 52 will engage the surface of the tooth adjacent or just below the fluid level and move into contact with or adjacent to the curved surface 40 (FIG. 4). As a result, when the indicator 10 is removed, will stay at the level of the fluid in the enclosed space and the operator can determine the level.

In another embodiment, the indicator 10 is used to determine the level of a fluid in a space or area that is flooded or filled with the fluid which is subsequently drained or lowered. In one embodiment, the space or area may be an underground structure, such as those used by utilities for example, that may be subject to monitoring. An operator may want to determine the high level mark of the fluid (e.g. water) that was within the underground structure. In this way, the operator can determine if any fluid may have infiltrated equipment within the space or determine whether it is appropriate for personnel to enter the structure. The float 46 stays at the high fluid level point until manually reset by an operator. In some embodiments, the underground structure may include a camera that allows the operator to remotely monitor the fluid level. In these embodiments, the body 12 and the float 46 may be colored with contrasting or different colors to facilitate viewing the indicator 10 with a remote video camera.

In these embodiments, the indicator 10 is mounted to a wall, door or other structure. The float 46 is initially positioned adjacent the first end 14. As fluid/water enters the underground structure, the float 46 will raise with the fluid. As the fluid recedes, the shaft 52 will engage the next lower tooth 24, 26 and remain at substantially the level of the high point of fluid in the underground structure. In one embodiment, a plurality of indicators 10 may be mounted within the underground structure, with each indicator 10 being vertically above and offset from the adjacent lower indicator 10. This may provide advantages in allowing an operator to quickly assess the range of the fluid level within the underground structure or enclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluid level indicator for measuring a high fluid level, the fluid level indicator comprising:
   a body having a first end and a second end, the second end being vertically closer to the ground than the first end, the body having a first arm extending between a first side of the first end and a first side of the second end, the body further having a second arm extending between a second side of the first end and a second side of the second end, the first arm and the second arm defining a slot therebetween, the body further including a first plurality of teeth extending from the first arm in the slot, the first plurality of teeth extending on an angle away from the first end toward the second arm, the body still further including a second plurality of teeth extending from the second arm in the slot opposite the first arm, the second plurality of teeth extending on an angle away from the first end toward the first arm, wherein each of the second plurality of teeth are vertically offset from the first plurality of teeth; and a float member having a first member and a second member with a shaft disposed therebetween, the float member being arranged with the shaft member disposed in the slot, the shaft being sized to cooperate with one of the first plurality of teeth or the second plurality of teeth to hold the float member at a high fluid level position in response to a fluid receding from the high fluid level position.

2. A fluid level indicator comprising:

a body having a first end and a second end, the body having a first arm extending between a first side of the first end and a first side of the second end, the body further having a second arm extending between a second side of the first end and a second side of the second end, the first arm and the second arm defining a slot therebetween, the body further including a first plurality of teeth extending from the first arm in the slot, the first plurality of teeth extending on an angle away from the first end toward the second arm, the body still further including a second plurality of teeth extending from the second arm in the slot opposite the first arm, the second plurality of teeth extending on an angle away from the first end toward the first arm; and a float member having a first member and a second member with a shaft disposed therebetween the float member being arranged with the shaft member disposed in the slot, wherein the second plurality of teeth are offset from the first plurality of teeth in a direction away from the first end, wherein each of the first plurality of teeth have a third end and each of the second plurality of teeth have a fourth end, the third end being closer to the second arm than the fourth end and the fourth end being closer to the first arm than the third end.

3. The fluid level indicator of claim 2 wherein each of the plurality of second teeth are disposed between two adjacent teeth in the plurality of first teeth with a gap therebetween, the gap sized to allow the shaft to move therethrough.

4. The fluid level indicator of claim 3 wherein the first member and the second member have a cylindrical shape.

5. The fluid level indicator of claim 4 wherein the first plurality of teeth and the second plurality of teeth are arranged on a 45 degree angle.

6. A fluid level indicator comprising:

a body having a slot extending along the length of the body, the body also having a first set and a second set of opposing teeth within the slot, the first set and second set of opposing teeth being arranged on an angle in an interlaced manner, each of the teeth in the second set of teeth being disposed between adjacent pairs of teeth in the first set of teeth, the first set of teeth and second set of teeth defining a gap therebetween; and a float member movably coupled to the body, the float member having a shaft extending through the slot and sized to be movable between the first set and second set of opposing teeth.

7. The fluid level indicator of claim 6 wherein the float member further comprises a first member coupled to an end of the shaft adjacent the body.

8. The fluid level indicator of claim 7 wherein the float member further comprises a second member coupled to an end of the shaft adjacent the body opposite the first member.

9. The fluid level indicator of claim 8 wherein the first set of teeth and second set of teeth are arranged on a 45 degree angle.

10. The fluid level indicator of claim 9 wherein the first member and second member have a cylindrical shape.

11. The fluid level indicator of claim 10 wherein the float member is made from a material having a density less than water.

12. The fluid level indicator of claim 11 wherein the body includes a first end and a second end, the first end and the second end defining the ends of the slot.

13. The fluid level indicator of claim 12 wherein the first end includes a feature configured to receive a fastener.

14. The fluid level indicator of claim 13 wherein the second end includes a feature configured to receive a fastener.

* * * * *